United States Patent [19]

Hawley et al.

[11] Patent Number: 4,704,064
[45] Date of Patent: Nov. 3, 1987

[54] PAPER ROLL ELEVATOR LIFT

[75] Inventors: Michael E. Hawley, Beaconsfield; Jack Roth, Montreal, both of Canada

[73] Assignee: Enterprises International, Inc., Hoquiam, Wash.

[21] Appl. No.: 815,353

[22] Filed: Dec. 30, 1985

[51] Int. Cl.[4] .......................................... B65G 47/00
[52] U.S. Cl. .................................... 414/592; 193/32; 198/463.3; 187/15; 187/32; 414/911; 414/745; 414/609
[58] Field of Search ............... 414/910, 911, 609, 610, 414/612, 615, 616, 748, 592, 745, 331; 187/15, 16, 32; 198/463.3, 468.8, 468.6; 193/40, 32

[56] References Cited

U.S. PATENT DOCUMENTS

| 414,516 | 11/1889 | Gehrke . | |
|---|---|---|---|
| 1,021,876 | 4/1912 | Lister | 198/463.3 |
| 1,525,870 | 2/1925 | Lee | 198/463.3 |
| 1,782,410 | 11/1930 | Cook . | |
| 1,877,934 | 9/1932 | Milbrath | 198/463.3 |
| 2,755,950 | 7/1956 | Forshey | 414/276 X |
| 3,179,262 | 4/1965 | Carlson, Sr. et al. | 414/752 X |
| 3,494,434 | 2/1970 | Rivers . | |
| 3,750,849 | 8/1973 | Berkovitz . | |
| 3,802,579 | 4/1974 | Genest et al. . | |
| 3,860,130 | 1/1975 | Frangos . | |
| 3,973,686 | 8/1976 | Rivers . | |
| 4,023,687 | 5/1977 | Salloum | 414/276 |
| 4,071,150 | 1/1978 | Thompson et al. | 414/276 X |
| 4,205,934 | 6/1980 | Pantin et al. | 414/84 X |

FOREIGN PATENT DOCUMENTS

| 370941 | 3/1923 | Fed. Rep. of Germany . | |
| 336976 | 4/1959 | Switzerland . | |
| 495189 | 12/1938 | United Kingdom . | |
| 715633 | 9/1954 | United Kingdom | 414/610 |

Primary Examiner—Frank E. Werner
Attorney, Agent, or Firm—Seed and Berry

[57] ABSTRACT

An industrial elevator for automatically handling paper rolls at high volume is described. The elevator includes load-receiving platforms at both the initial and final floor levels, interconnected by a chain suspension system such that each platform travels only one-half the distance between floors, meeting at an intermediate level where the roll transfers from one platform to the other before continuing on to the discharge level. Each platform includes a stop arm system which receives a roll, rolling on its lateral edge, absorbing its dynamic energy and bringing the roll to a stop. The roll is cradled on the stop arm such that, on positive release, a rolling motion is imparted to the roll and it rolls from the discharging platform.

3 Claims, 2 Drawing Figures

PAPER ROLL ELEVATOR LIFT

DESCRIPTION

1. Technical Field

The invention relates to industrial elevator lifts for transferring large cylindrical articles or other equipment between floor levels. More particularly, the invention relates to elevators which are capable of handling paper rolls in paper-making operations at high production or volume rates.

2. Background Art

In the manufacture of pulp and paper and in converting paper into finished products, large rolls of pulp and paper stock must often be moved from one floor level to another for variations processing operations, storage or shipping. Handling time and effort can consume significant resources in, for example, the modern, high-speed paper mill where paper machines operate at production rates of over 3,000 feet of paper per minute, generating many rolls of finished paper. It is, of course, necessary to move the rolled stock from the paper machine winders quickly to roll finishing processing.

In a typical mill operation where transfer of paper rolls from one floor to another is required, an overhead crane or a lift truck lifts a roll to be transferred and moves it onto a conventional freight elevator. The roll then must be unloaded and moved to the processing, storage or shipping point. Moving the rolls by such means thus requires manpower and various lifting equipment to individually handle each roll.

In newer mills, machine floor layout and systems of conveyors facilitate some automatic and machine-assisted transport of paper roll production, which avoids requiring that each roll be handled and at higher rates of speed. However, moving a roll from one floor to another remains, heretofore, a slow process, requiring significant operator attention.

DISCLOSURE OF INVENTION

It is an object of the elevator lift of the invention to move cylindrical objects, typically heavy rolls of paper, from one building floor to another at a rapid rate. In its preferable embodiment, the elevator of the invention is capable of transferring paper rolls substantially automatically without need of significant operator effort.

It is an object of the invention to receive a paper roll while it is rolling on its lateral edge at one floor and discharge it, slightly rolling, onto another floor without an operator having to manipulate the roll or elevator during transfer. The elevator of the invention may transfer rolls at a rate of about three rolls per minute, wherein the roll shave a weight generally less than 7000 pounds, a length up to 110 inches, and a diameter of about 30–72 inches.

In essence, the elevator of the invention achieves a rapid cycle time by means of a pair of elevator platforms equipped with means for absorbing the rolling energy of the rolls. The platforms travel in opposing directions such that each travels only one-half the distance between the two floor levels and affects a transfer of the load from one platform to another at the midpoint of their travel.

The elevator platforms, one at each floor level for receiving a roll, are spaced horizontally as well as vertically from one another. A cable system for adjusting the elevation of each platform between levels suspends and interconnects the two platforms. The cable system is arranged such that, as one platform rises in elevation, the other, in response, simultaneously declines in elevation an identical distance. In operation, both platforms are at an identical elevation at some intermediate elevation between the floors. At the intermediate level, a fixed platform or transfer point is provided between and substantially horizontally adjacent to the suspended platforms, which platform permits horizontal transfer of the roll or load from one platform to the other. The lift includes an actuator for engaging a platform to move it vertically, and hence the other cable-connected platform as well, between each platform's respective floor level and the intermediate transferring level. The platform is loaded at a first floor level, adjusted in elevation to the fixed platform level for transfer of the load horizontally across the fixed platform to the other platform, and then both platforms are returned to their respective levels, with the load discharged from the second level.

Preferably, for use in transferring cylinder loads, such as a paper roll, that are transported in and out of the elevator while rolling on its lateral edge, the elevator lift includes cylinder stops on each platform for receiving, stopping and discharging the rolling cylinders from the platforms. The cylinder stops in a preferred embodiment include a stop arm forming a surface or deck for receiving and supporting the roll, which arm is pivoted along the discharge side or edge of the platform. The stop arm is supported at its infeed side or edge of the platform by means of a pneumatic cushion which is capable of adjusting the infeed surface downwardly to absorb the energy of and stop and advancing roll as it rolls onto the platform. The arm is then adjustable upwardly to assist in securing the roll while it is on the platform and to speed discharge of the roll from the platform. The cylinder stop also includes a stop cylinder adjacent to the discharge edge of the platform for positively stopping and holding the discharge side of the roll while the roll is on the platform. The stop cylinder is retractable to release the roll for discharge from the supporting platform surface.

The cable system of the elevator lift is typically roller chain directed about chain-engaging sprockets which are loaded directly over the platform. Each end of the chain is fixed to the platform.

The actuator means is preferably a hydraulic cylinder having an operating rod fixed to the base of the upper platform wherein retraction of said cylinder causes the platform to simultaneously reach the intermediate transfer level and extension of the rod returns the platforms to their respective floor elevations.

BEST MODE FOR CARRYING OUT THE INVENTION

Figure 1:
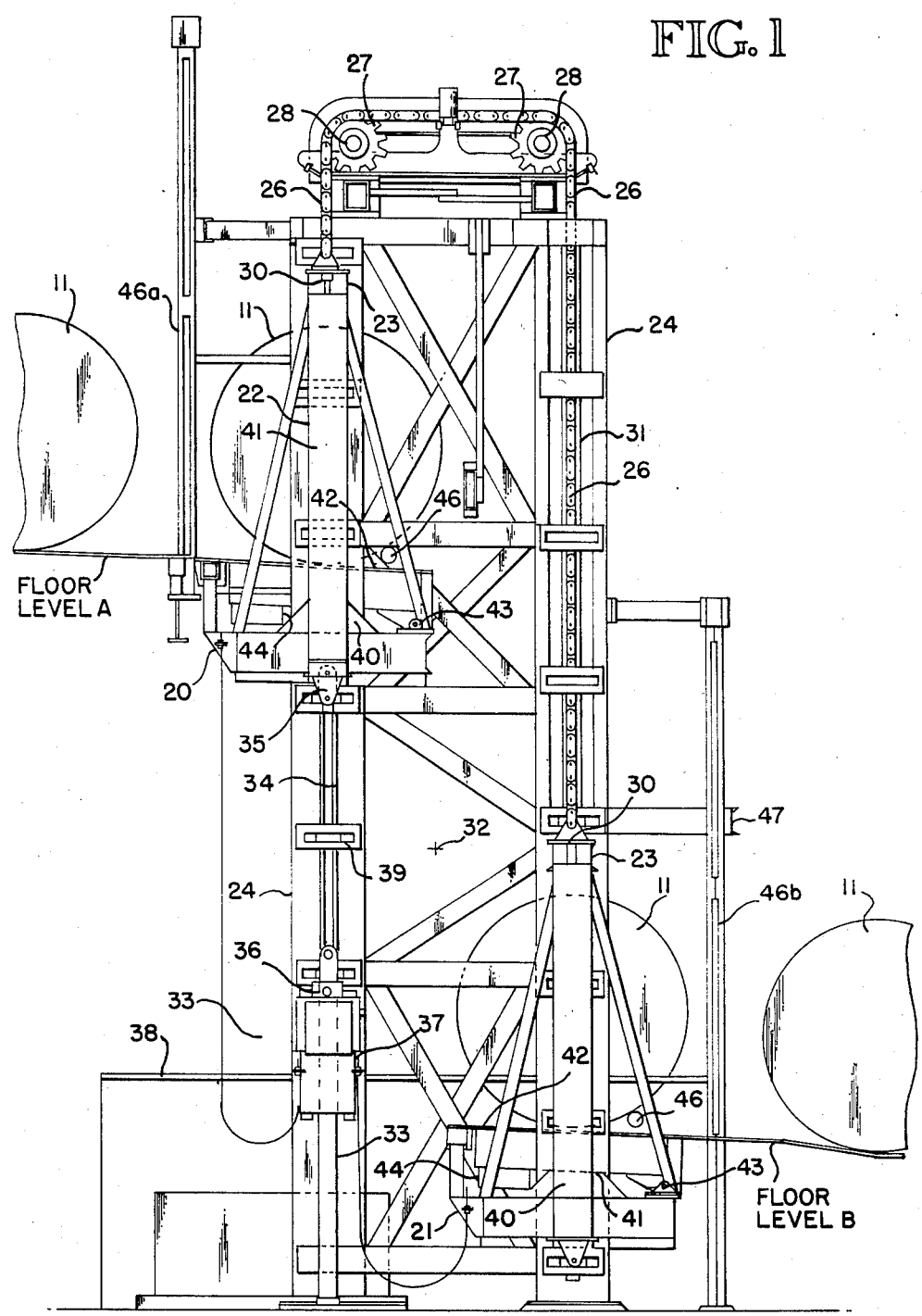
FIG. 1 is a side elevational schematic view of the elevator lift of the invention.

Referring to FIG. 1, a preferred embodiment 10 of the invention is shown, typically installed in an elevator shaft extending between a paper mill upper floor elevation A and a lower floor elevation B. Paper rolls 11 are shown at various positions on the elevator or at discharge on the lower floor B.

The elevator includes a pair of platforms 20, 21, one at each floor level. The platforms are substantially rectangular in shape, designed to accommodate the maximum dimensions and weight of the paper rolls to be transferred. As shown in the figure, the platforms are spaced horizontally one from the other, as well as vertically. The platform structure includes sufficient vertical columns 22 and horizontal beams 23 to support the load yet allow the paper roll sufficient clearances to roll on and off the platform without interference.

The platforms 20, 21 are suspended from a framework 24. The supporting frame structure 24 is fabricated such that the elevator of the invention is self-supporting. The framework provides support and guide rails for guiding vertical elevation of the platforms 20, 21. Platform limit switches, a safety gate support structure, and enclosure panels are attached to the frame.

The platforms 20, 21 are suspended in the framework by means of a roller chain cable 26. The frame supports two pairs of sprockets 27 which engage the roller chain 26. Each pair of sprockets 27 is mounted on a shaft 28 supported by bearings 29. The sprocket pairs are located in the framework 24 such that each end of the chain is directed vertically downward, connecting to a supporting horizontal member 23 at a connecting fastener 30 of the platform, above the platform longitudinal center line. The roller chain 26 is confined between guides 31 which are fixed to the frame. The roller chains are sized in length such that, with one end of the chain connected to the infeed platform 20 and the other end to the discharge platform 21, as one platform rises, the other lowers until the two platforms are at an identical elevation 32 midway between the two floors A, B.

A hydraulic actuator 33 includes a cylinder rod 34 directly connected via pin connection 35 to the infeed platform 20. It operates by means of a hydraulic power unit 36 that includes an electrical motor-driven pump 37 mounted on a hydraulic oil reservoir 38. Control valves (not shown) for the unit are located adjacent to the elevator. The hydraulic actuator 33 is trunnion-mounted on the main frame. The cylinder rod 34 is fully extended when the infeed, i.e., the upper platform in the embodiment shown, is at the upper floor level A. A support bearing 39 provides intermediate support for the cylinder rod.

Each platform preferably includes a cushioned roll stop 40 which receives a cylinder or paper roll 11 rolling on its lateral edge, absorbs its energy, and brings the cylinder to a stop. The cylinder 11 is then positioned on the roll stop such that it rolls free of the platform upon positive release. The roll stop includes a stop arm 41, having a supporting deck 42 which supports the roll while it is on the platform. The supporting surface or deck 42 is slightly smaller in dimension than the platform and is pivoted along the discharge side of the platform by means of a pin connection 43. The infeed portion of the stop arm is supported on pneumatic cushions 44, which permit raising and lowering of the front infeed portion of the stop arm. The stop arm is provided with a latch mechanism (not shown) to secure it at a desired elevation. The cushioned roll stop is also provided with a roll stop cylinder 45 which extends along the discharge edge of the supporting deck 42 and is sufficiently elevated to positively stop and hold the roll on its discharge side while the roll is on the platform. The stop cylinder is retractable to release the roll for discharge from the supporting surface.

Figure 2:
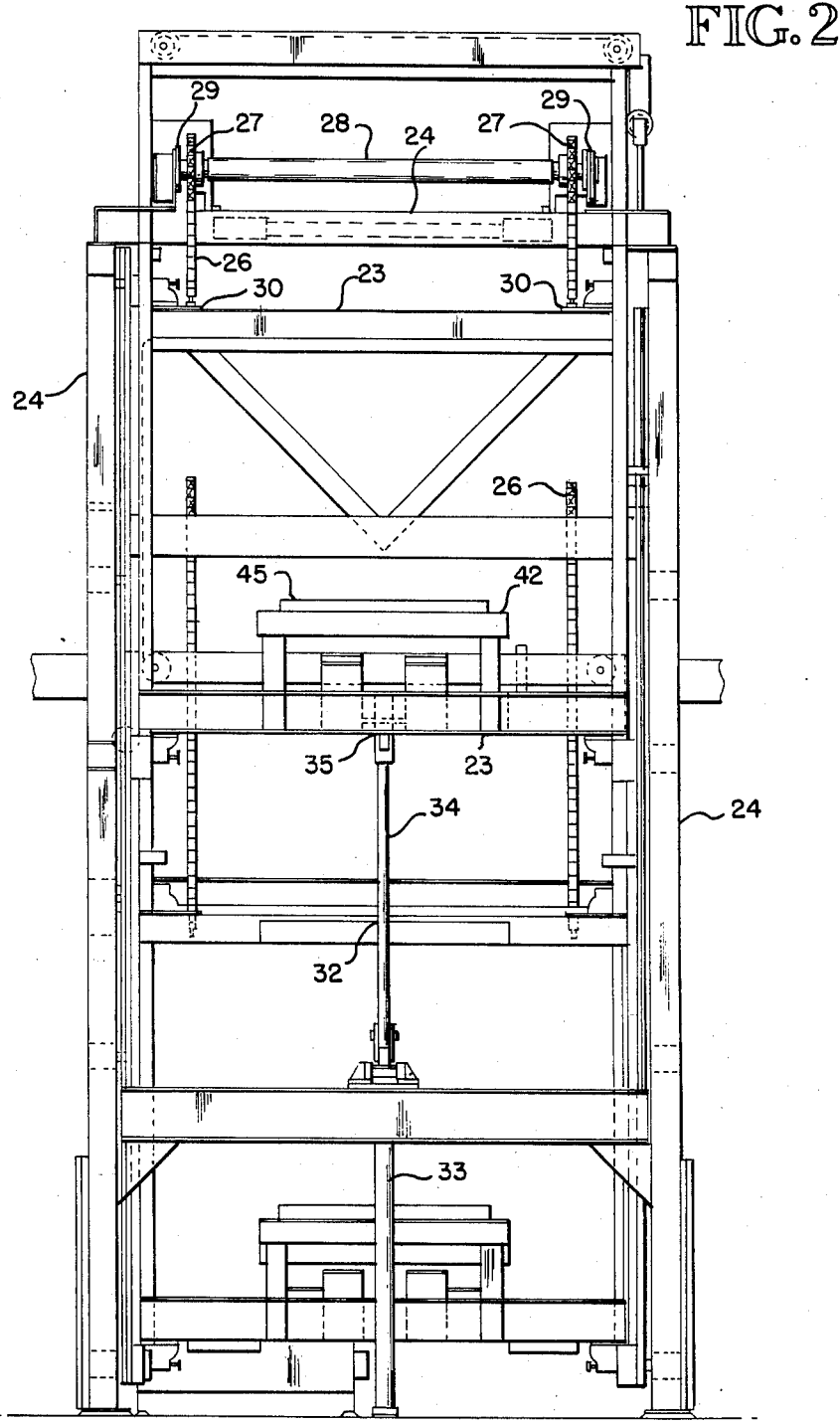
FIG. 2 is a front elevational view of the elevator lift of the invention.

The elevator of the invention is provided with a fixed point 32 midway between the two floors for transfer of roll from one platform to the other. In the preferred embodiment shown in FIGS. 1 and 2, the platforms are substantially adjacent to one another such that the transfer platform is substantially only a point where both platforms are at an identical intermediate level. Where the direction of transfer is from a higher to a lower level, an emergency roll stop 47 is provided on the discharge side of the elevator, fixed to the frame. In some situations, the point of load transfer may be a fixed platform. Such a situation would require horizontal spacing between the platforms to be increased by the width of the fixed platform. It is contemplated that such a fixed platform would be as short as possible or even substantially nonexistent, as in the case of the FIG. 1 embodiment, where transfer speed is of the essence.

The elevator includes safety gate systems 46A, 46B, fixed to the frame at both the entry and discharge levels, designed to prevent personnel from entering the elevator as well as closing off the entry when the elevator platform is operating. On the preferred elevator, the safety gates operate automatically, typically by pneumatic cylinders (not shown), as part of the operating sequences.

In operation, where rolls are to be lowered from floor A to floor B, the infeed platform 20 is initially at the A level, with the upper gate 46A open. The cushioned roll stop arm 41 is in the raised position to allow the paper roll cylinder to roll onto the platform 20. The discharge platform 21 is at the lower level B. The platform 21 may be holding a roll ready for discharge or it may have already discharged a roll. The lower gate 46B is open during discharge of a roll, or closed, if the roll is being held or has been discharged.

A transfer mechanism in the mill (not shown) initiates the elevator by rolling a paper roll cylinder on its lateral edge toward the elevator at the infeed level. The cylinder interrupts a photoelectric cell, which opens the safety gate 46A, and, as soon as the roll has begun to move on the platform, initiates movement of the pneumatic air cushions 44 of the stop arm 41 downwardly, changing the angle of the roll-receiving deck 42 to oppose the rolling of the cylinder and absorb its dynamic energy until the roll stops. As the roll stops, the stop cylinder 45 is actuated and extended upwards from the supporting surface into position to positively stop the roll. The roll stop arm is then elevated, causing the roll to positively engage with the stop cylinder 45. The roll is thus cradled between the somewhat elevated roll stop arm deck 42 and the roll stop cylinder 45. The stop arm is in a roll holding position and a latching mechanism (not shown) is engaged to lock the arm in place.

As the roll clears the elevator entry photoelectric cell, a signal is provided to the upper gate 46A to initiate its closing. Once the upper gate has closed, the elevator may then start its cycle, so long as a roll, if any, on the discharge platform 31 has discharged and the lower gate 46B has closed.

The elevator is lowered by means of the actuator system 33, in which a down valve and down-slow valve are energized. The infeed platform 20 lowers and the discharge platform 21 rises at rapid speed. When the infeed platform 20 is approximately 12 inches from the midpoint roll transfer position 32, a slowdown switch is actuated, which continues until the transfer position 32 is reached.

At the transfer level on the infeed platform 20, the stop arm latching mechanism is released and the stop cylinder 45 retracts into the arm deck 42. The roll is released, and, since the infeed portion of the arm deck is elevated, the roll quickly rolls onto the discharge platform 21.

The discharge platform 21 operates substantially identically to the infeed platform 20. As the roll moves onto the discharge platform, it actuates the roll stop cushions 44 downwardly, which causes the roll stop arm to retract to absorb the energy in stopping the advancing roll. At the same time, the stop cylinder 45 is energized and elevated to provide a positive stop for the roll. A cushion lift-up valve is then energized to lift the entering edge of the discharge platform to increase the slope so that the roll quickly and positively moves into contact with the elevated stop cylinder 45. The stop arm continues elevating until it is in the holding position, cradling the roll between the arm deck surfaces and the stop cylinder. The position locking mechanism to lock the arm in place is then engaged.

The elevator actuator is then energized to return the infeed platform 20 to the upper level A, while, at the same time, the discharge platform 22 lowers to the lower floor level B. As the infeed platform moves upward, the cushion and cylinder stop valves of the stop mechanism are energized to return the stop arm 44 to its receiving position and return the roll stop deck 42 to its normal slope. As the infeed platform rises, while the discharge platform is lowering, the elevator slow-up switch is actuated, de-energizing the full-speed upward valve, and the platform approaches the upper level slowly. As the platform travels the final 12 inches at slow speed, the discharge platform 21 will actuate a switch to stop its travel.

If the discharge area from the elevator is free to receive a roll as the elevator goes into slow-speed cycle, the lower gate 46B will be actuated and rise. If the discharge area is not clear to receive a roll, the gate will remain closed until the area is clear. Once the gate is up, the roll stop cylinder 45 disengages the latching mechanism and retracts the stop cylinder to release the roll. The roll, standing on the inclined stop arm deck 42, will roll clear of the elevator platform, where it will interrupt and then restore a photocell which will thereafter lower the lower gate. The stop arm system is then returned to its roll-receiving position in preparation for the next cycle.

In the preferred embodiment, the rolls are transferred from an upper level A to a lower level B. The elevator can be operated just as well in the reverse, raising rolls to a higher level. The system will, of course, handle any cylindrical object to advantage, particularly where there is interest in maintaining a high rate of transfer. The apparatus is particularly well suited for receiving rolling objects that have no on-board braking mechanism since the roll stop system substantially catches a rolling object, absorbing all of its dynamic energy, and then, at transfer, imparts rolling energy to the object to advance it to its next operation. No operators are involved in manipulating the articles or paper rolls, and thus the elevator of the invention has great advantage with respect to safety as well as labor-saving benefits.

We claim:

1. A lowerator for transferring large cylindrical paper rolls between two floor levels, comprising:
   a pair of platforms mounted in a frame, each platform positionable for receiving a cylindrical roll rolling on its lateral edge, said platforms being horizontally and vertically spaced from one another but movable into generally horizontal alignment;
   a roll stop on each platform for cushioning and stopping said rolling roll on said platform;
   reciprocating means interconnected to each platform for simultaneously synchronously raising one platform while lowering the other platform an equal distance to a generally horizontally aligned transfer point, the weight of one platform when moving down counterbalancing the weight of the other platform moving up;
   said transfer point located at an intermediate elevation between floor levels, each said platform having a tiltable roll-receiving deck, means for tilting said deck to discharge rolls off said platforms and causing said roll at said transfer point to roll substantially horizontally from one platform to the other; and
   wherein a roll loaded onto a first platform at an upper floor level is lowered in elevation to the transfer point, where the tilting deck transfers the roll to the second platform, which is then lowered to the second floor level, while the first platform is raised to the upper floor level.

2. The elevator of claim 1 wherein said cushioning roll stop on each platform comprises:
   a stop arm positionable over the tilting deck to stop the roll and retractable out of the path of the roll to allow the roll to roll off the tilted deck for discharging the roll from the platform.

3. The elevator lift of claim 1 wherein said platform reciprocating means includes a hydraulic cylinder having a cylinder rod, the rod and cylinder being connected between the frame and one platform for reciprocating one platform, chain means connecting the platforms, whereby reciprocation of one platform causes the other platform to be raised simultaneously by the chain.

* * * * *